United States Patent
Li et al.

(10) Patent No.: US 11,539,161 B2
(45) Date of Patent: Dec. 27, 2022

(54) CONVERTIBLE FORCE LATCHING SYSTEM

(71) Applicant: IDEAL Industries, Inc., Sycamore, IL (US)

(72) Inventors: Jia Yong Li, Westford, MA (US); Brian Robert Peterson, Cumberland, RI (US)

(73) Assignee: IDEAL Industries, Inc., Sycamore, IL (US)

( * ) Notice: Subject to any disclaimer, the term of this patent is extended or adjusted under 35 U.S.C. 154(b) by 203 days.

(21) Appl. No.: 17/173,352

(22) Filed: Feb. 11, 2021

(65) Prior Publication Data
US 2021/0173947 A1 Jun. 10, 2021

Related U.S. Application Data

(63) Continuation of application No. 16/229,121, filed on Dec. 21, 2018, now Pat. No. 10,938,149.
(Continued)

(51) Int. Cl.
*H01R 13/62* (2006.01)
*H01R 13/639* (2006.01)
(Continued)

(52) U.S. Cl.
CPC ..... *H01R 13/6205* (2013.01); *G06F 9/45558* (2013.01); *G06F 12/0804* (2013.01);
(Continued)

(58) Field of Classification Search
CPC ............ H01R 2201/26; H01R 13/6205; H01R 13/111; H01R 24/20; H01R 13/633; H01R 13/6456; H01R 24/28
See application file for complete search history.

(56) References Cited

U.S. PATENT DOCUMENTS 1,238,345 A  8/1917  Schoenle
2,609,221 A  9/1952  Schultz
(Continued)

FOREIGN PATENT DOCUMENTS

CN  105938967 A  9/2016
JP  10112354 A  4/1998
(Continued)

OTHER PUBLICATIONS

JPO, Office Action issued on Japanese patent application No. 2020-534359, dated Nov. 24, 2021, 5 pages.
(Continued)

*Primary Examiner* — Jean F Duverne
(74) *Attorney, Agent, or Firm* — Greenberg Traurig, LLP

(57) ABSTRACT

A convertible force latching system includes two complementary connector bodies. Each connector body has a first mating face under which two series of magnets oriented alternating directions. A moving portion of the latching system allows the connector bodies and the magnets within to alter their alignment by the interaction of a user along a predetermined motion path. In a first arrangement, the series of magnets are aligned with such that the magnets of one connector body are attracted to the magnets of the other connector body. When the user actuation shifts the moving portion, the second arrangement positions the series of magnets such that they are aligned such that the magnets of one connector body are repelled to the magnets of the other connector body.

20 Claims, 7 Drawing Sheets

Related U.S. Application Data

(60) Provisional application No. 62/608,958, filed on Dec. 21, 2017.

(51) Int. Cl.
  *H01R 13/631* (2006.01)
  *G06F 9/455* (2018.01)
  *G06F 12/0804* (2016.01)
  *G06F 12/0864* (2016.01)
  *G06F 12/0891* (2016.01)
  *G06F 21/60* (2013.01)
  *H04L 9/08* (2006.01)

(52) U.S. Cl.
  CPC ...... *G06F 12/0864* (2013.01); *G06F 12/0891* (2013.01); *G06F 21/602* (2013.01); *H01R 13/631* (2013.01); *H01R 13/639* (2013.01); *H04L 9/0866* (2013.01); *G06F 2009/45583* (2013.01)

(56) References Cited

U.S. PATENT DOCUMENTS

| | | | |
|---|---|---|---|
| 2,813,741 A | 11/1957 | Janos | |
| 2,877,040 A | 3/1959 | Curtiss et al. | |
| 2,877,041 A | 3/1959 | Foley | |
| 2,901,278 A | 8/1959 | Robinson | |
| 2,990,210 A | 6/1961 | Fremstad | |
| 3,276,804 A | 10/1966 | Heppner | |
| 3,345,102 A | 10/1967 | Padgett | |
| 3,350,127 A | 10/1967 | Hekelaar | |
| 3,425,729 A | 2/1969 | Bisbing | |
| 3,492,037 A | 1/1970 | Hutchinson | |
| 3,744,833 A | 7/1973 | Berducone | |
| 3,790,197 A | 2/1974 | Parker | |
| 3,794,366 A | 2/1974 | Graham | |
| 3,984,795 A | 10/1976 | Gaskill | |
| 5,485,733 A | 1/1996 | Hoffman | |
| 5,611,120 A | 3/1997 | Riceman et al. | |
| 5,909,100 A | 6/1999 | Watanabe et al. | |
| 6,195,898 B1 | 3/2001 | Lemisch | |
| 2004/0183313 A1 | 9/2004 | Sherman et al. | |
| 2011/0171837 A1 | 7/2011 | Hardisty et al. | |
| 2011/0193354 A1 | 8/2011 | Simmonds | |
| 2015/0102879 A1 | 4/2015 | Jacobs et al. | |
| 2016/0003270 A1* | 1/2016 | Franklin | H01F 7/0221 439/529 |
| 2016/0180999 A1 | 6/2016 | Rattner et al. | |
| 2017/0005435 A1 | 1/2017 | Grieg | |
| 2017/0062999 A1 | 3/2017 | Thiers | |
| 2017/0264045 A1* | 9/2017 | Eslava | H01R 13/6205 |
| 2018/0191097 A1 | 7/2018 | Yonnet | |
| 2018/0212359 A1* | 7/2018 | Wei | H05K 1/181 |

FOREIGN PATENT DOCUMENTS

| | | |
|---|---|---|
| JP | 2009205912 A | 9/2009 |
| JP | 2014160637 A | 9/2014 |
| JP | 2016119157 A | 6/2016 |
| WO | 2017001755 A1 | 1/2017 |

OTHER PUBLICATIONS

JPO, English translation of Office Action issued on Japanese patent application No. 2020-534359, dated Nov. 24, 2021, 5 pages.
EPO, extended European search report issued on European patent application No. 18892895.6, dated Dec. 6, 2021, 9 pages.
ISA/US, International Search Report and Written Opinion issued on PCT application No. US18/67116, dated Mar. 26, 2019, 10 pages.
Indian Patent Office, first examination report issued on Indian patent application No. 202017025915, dated Sep. 10, 2021, 5 pages.

* cited by examiner

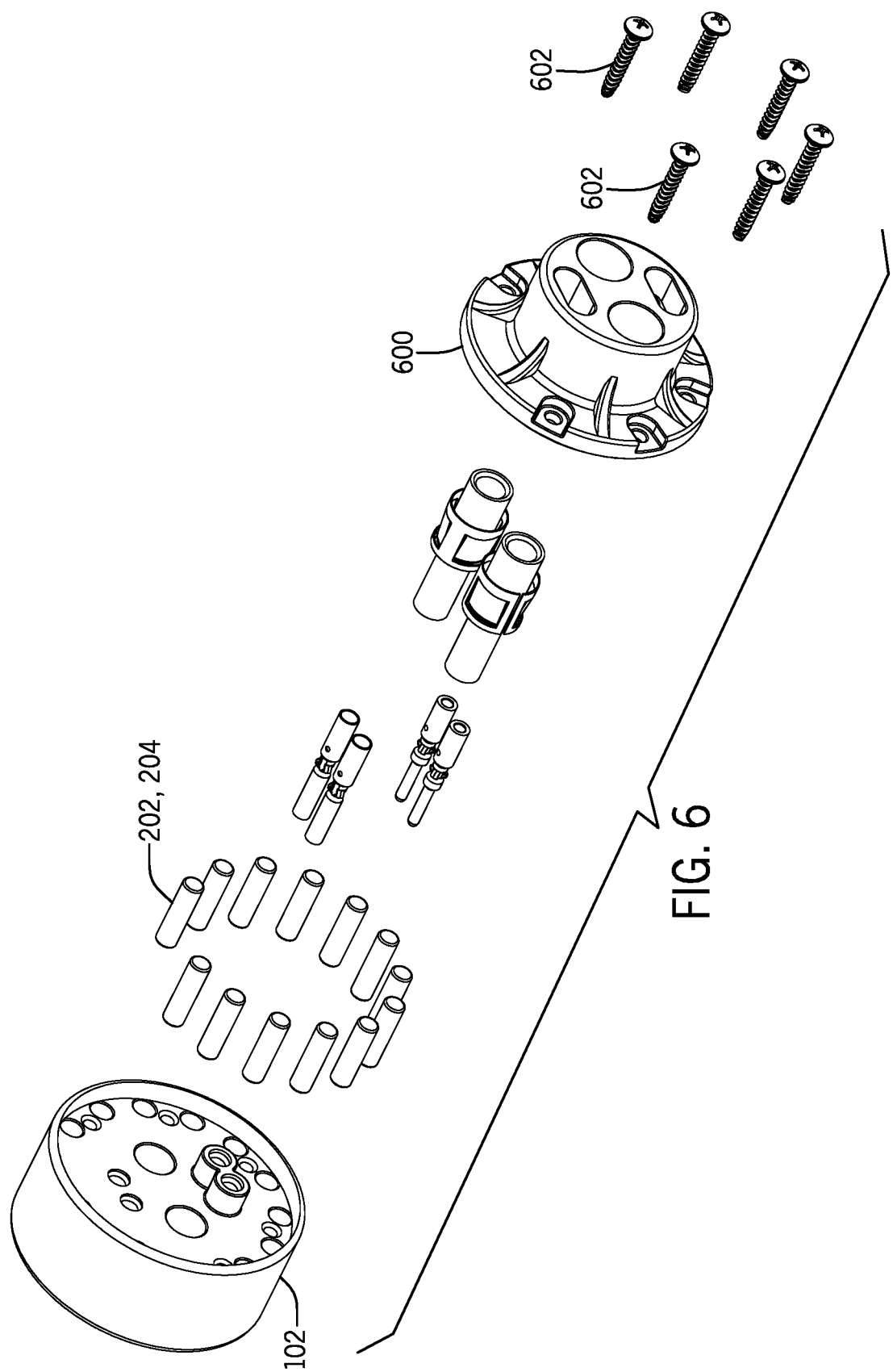

CONVERTIBLE FORCE LATCHING SYSTEM

CROSS-REFERENCE TO RELATED APPLICATIONS

This application is a continuation of and claims the benefit of U.S. patent application Ser. No. 16/229,121 filed Dec. 21, 2018, which claims the benefit of U.S. Provisional Appln. No. 62/608,958 filed Dec. 21, 2017, each of which are herein incorporated by reference in their entirety.

FIELD OF THE DISCLOSURE

The present description relates generally to electrical connectors and more precisely to a convertible force latching system for an electrical connector.

BACKGROUND OF RELATED ART

Various magnetic latching systems are known, often used in fields of art like cabinetry. U.S. Pat. No. 3,790,197 describes a magnetic latch that is used for maintaining a hinged member in a closed position. The magnets are movable in an axial direction and require a manually operable member such as a lever bar mounted on a pivot in order to change the magnet position for repulsion force.

Other example magnetic latches include U.S. Pat. No. 2,990,210 which describes a magnetic latch that is used for securing a member such as swinging doors of cabinets, cupboards, closets, or other objects. U.S. Pat. No. 2,877,041 describes a magnetic latch for a refrigerator door, which is used for securing a refrigerator door to prevent air leakage from within the cabinet. US Patent Publication No. 2011/0193354 describes a magnetic gate latch device. U.S. Pat. No. 3,984,795 describes a magnetic latch construction that utilizes the electromagnetic characteristic of magnets. U.S. Pat. No. 6,195,898 describes a quick release magnetic latch. U.S. Pat. No. 5,909,100 describes a charging connector for an electric vehicle.

In addition to the noted magnetic latches, various other mechanisms for latching connectors may be utilized, especially in the field of electrical connectors. For instance, threaded latches, spring latches, manual latches, snap fit latches, twist and lock mechanism, and/or no latch mechanism. Threaded latches typically add threads to the mating parts for retention, requiring tooling to mate and unmate and being time consuming to mate and unmate. Spring latches add locking features to the parts with spring mechanism to activate and deactivate the lock for mating and unmating. The retention force oftentimes degrades over time due to material wear out and spring degradation from mating and unmating, thereby typically shortening the cycle life. A manual latch typically hooks onto physical stops for retention. These types of latches are oftentimes hard to align to ensure they are in the proper position. Snap fit latching features oftentimes require tooling to unmate. Twist and lock features are typically hard to manufacture and have a shorter cycle life due to material wear out over time from mating and unmating.

Finally, using no latch and relying upon contact retention to keep the parts mated are generally difficult to unmate as they need to overcome the contact retention. Additionally, the contacts used have a shorter cycle life due to material wear out from mating and unmating as the retention degrades over time.

BRIEF DESCRIPTION OF THE DRAWINGS

FIG. 6 shows an exploded view of the first connector body of the example latching system of FIG. 1A.

DETAILED DESCRIPTION

The following description of example methods and apparatus is not intended to limit the scope of the description to the precise form or forms detailed herein. Instead the following description is intended to be illustrative so that others may follow its teachings.

Some of the problems with some of the known prior art mentioned above include: connectors, particularly electrical connectors tend to have a high mating and unmating force. Physical latches can be hard to disengage due to the size of any kind of connector. Physical latches also take up a lot of space that some designs do not have. Latches can wear out and fail to hold connection and maintain necessary connective force. Latches can also have an issue with ease of use for both engaging and disengaging as well as alignment to ensure the latch is in the proper position.

The example latching systems disclosed herein have nearly unlimited cycle life with consistent retention, and are easy to mate and unmate. More specifically, the act of latching is easier with the presently disclosed magnet latches because the attraction of unlike magnetic poles help to align and pull connectors together, which makes it easy to mate. The arrangement of the magnets with alternating poles is a pattern which allows the force to be switched between attraction and repulsion as needed. The repulsion of like magnetic poles can then be used to push connectors away from each other, which makes it easier to unmate. By putting magnets in a circular pattern, some of the examples disclosed below can help to reduce the overall size of latch without sacrificing the strength of latch. Finally, there is no damage or wear to the magnets from mating and unmating, and magnets do not lose strength over time under normal circumstances. This feature allows the example latching systems to have consistent retention force and a nearly unlimited cycle life.

Figure 1A:
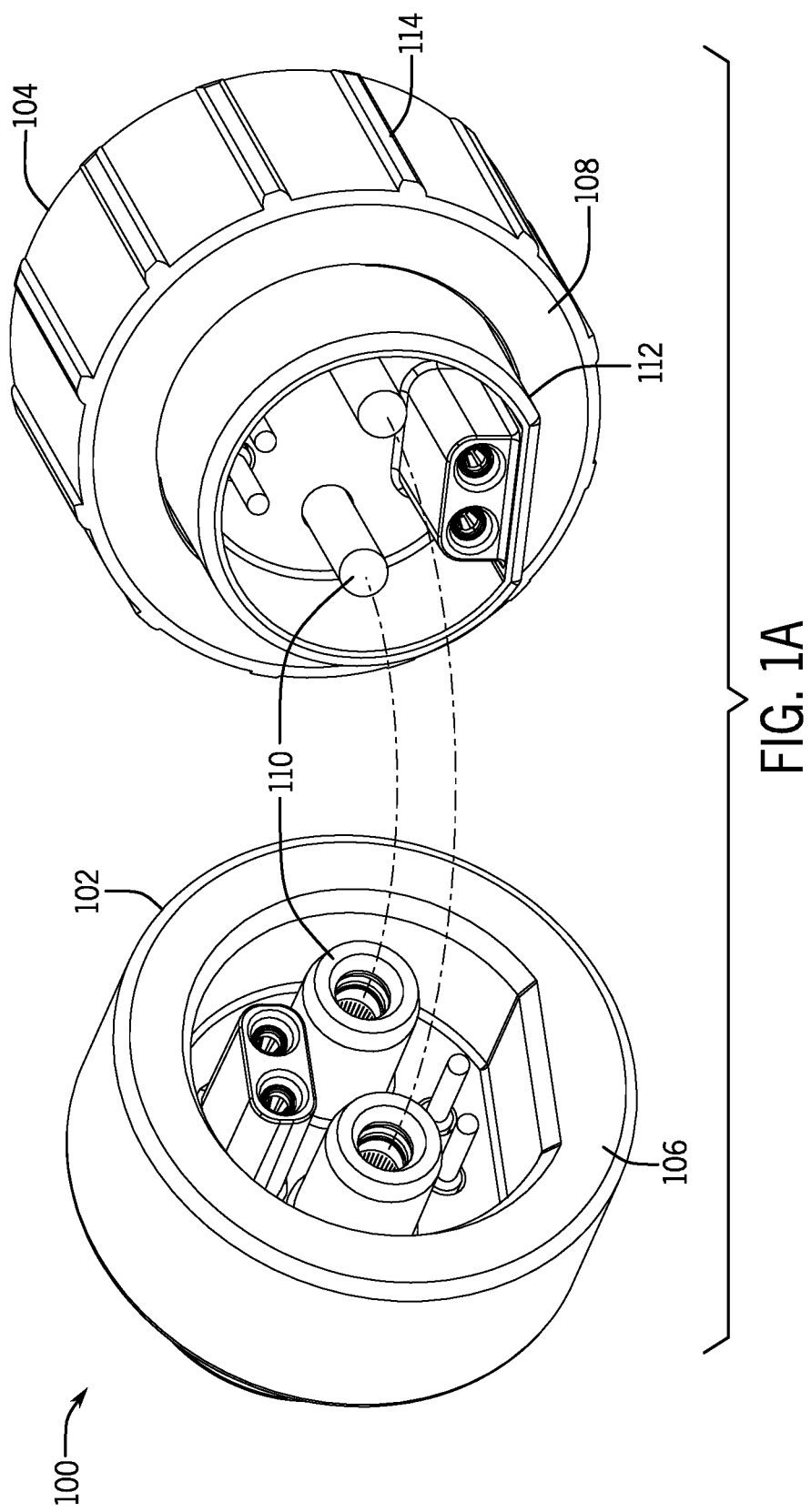
FIG. 1A is a perspective view of an example first and second connector body of the latching system according to the teachings of the present disclosure.

In the present disclosure, alternate magnetic poles are allocated in a circular pattern in the example shown in FIG. 1A and are arranged with a magnetic orientation that makes this latching system unique. Circular pattern was chosen instead of others to provide the maximum latch strength with the most compact size, but other examples are shown and discussed below as may be more beneficial to a specific user's needs. The example device utilizes both the attraction and repulsion characteristics of magnets in one single application, and also allows the force to be easily switched between attraction and repulsion as needed by simple rotation, translation, or other movement of the latching portion of the connector.

In these examples, all magnets are fully enclosed in the latch under both mated and unmated conditions. This provides extra protection to the magnets and makes the latch stay clean and easy to maintain, which allows the latch to have a long life.

In addition, the latch in one example of the present latching system is external to the connector which is more accessible by hand for rotation to unlatch. This eliminates the need for additional mechanism connected internally for unlatching, which allows the latch to have a more compact size and lower manufacturing cost due to less components involved.

Figure 1B:
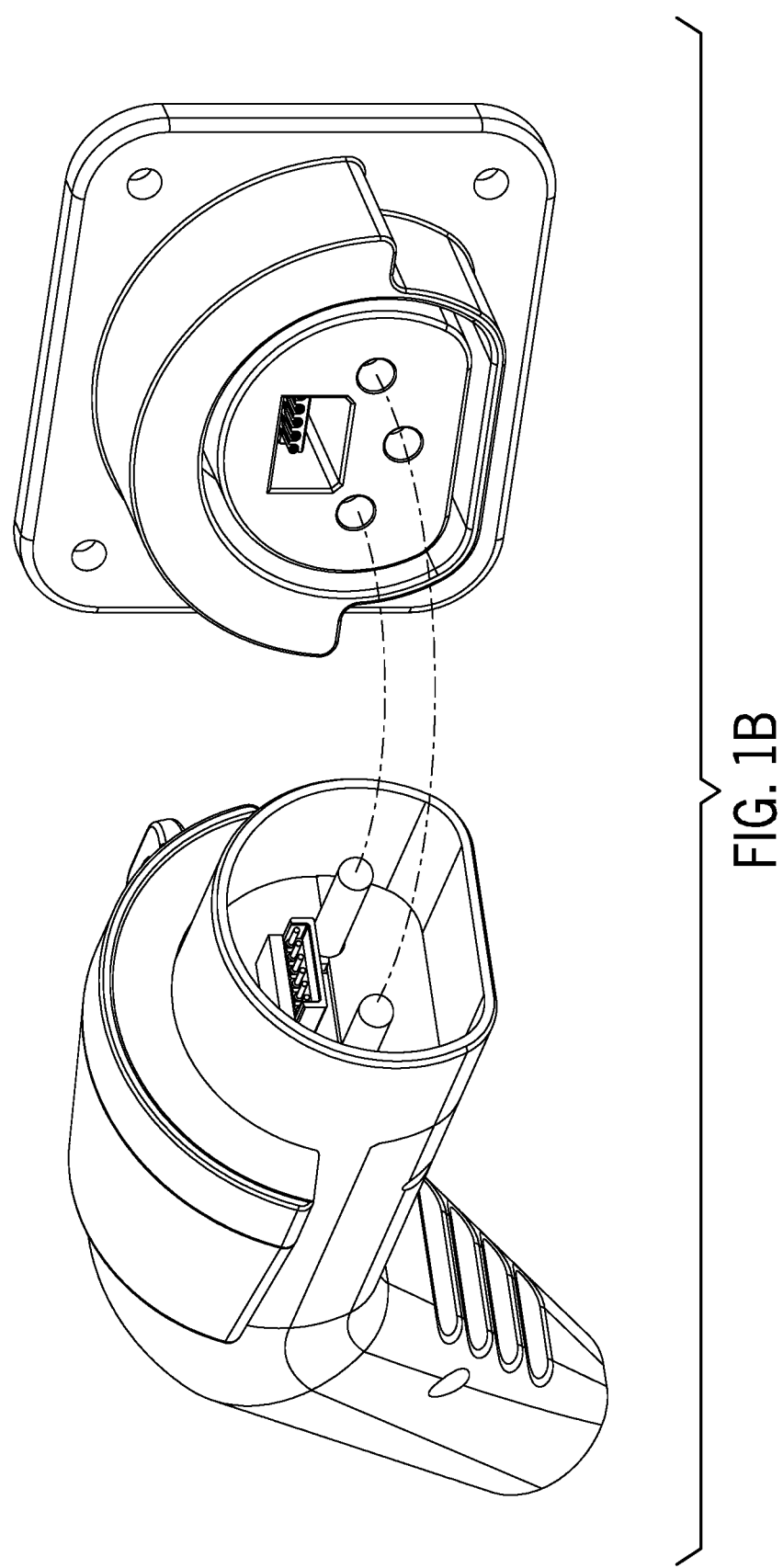
FIG. 1B is a perspective view of another example first and second connector body of the latching system according to the teachings of the present disclosure.

Referring now to the figures, FIGS. 1A and 1B show two examples of a pair of connectors which embody one example of the convertible force latching system according to the teachings of the present disclosure. The latching system in this example is comprised of two matched connector bodies, shown in FIG. 1A as first connector body 102 and second connector body 104. The first and second connector body 102, 104 are connected at mating surfaces 106, 108 thereby coupling the respective electrical connectors 110.

The first and second connector bodies 102, 104 are adapted to be mated with complementary shaping as such that the form of the first connector body 102 securely accepts the projections of the second connector body 104 within a recess. The coupling of the first and second connectors 102, 104 in some examples is a slight press fit such that the connectors cannot move relative to one another when connected.

Some of the first and second connector bodies 102, 104 have at least two possible subsections: a connecting portion 112 housing the electrical contacts 110 and latch portion 114. The latching portion 114 is usually positioned around the connecting portion 112. In the example shown, the second connecting body 104 has a moving latching portion 114. In other examples of the latching system 100, the latching portion may slide to translate linearly or move by any other suitable means as one of ordinary skill in the art would comprehend. On the sides facing each other, the first and second connector bodies 102 and 104 each have mating faces 106 and 108, respectively, positioned around electrical contacts 110. These are a relatively flat portion on the latching portions 114 of the connector bodies 102 and 104 near the outer periphery of each connector body 102, 104 in the example shown in FIG. 1A. The mating faces serve to bring the parts of magnetic latching mechanism appropriately oriented and sufficiently proximate to each other in order to function.

One of ordinary skill in the art will appreciate that electrical contacts 110 in the example shown are but one of many configurations that can be used. Any number of electrical connections of various gauges and arrangements thereof can be accommodated in each connector body 102, 104. One of ordinary skill in the art will also appreciate that the teachings of this disclosure could equally be applied to other types of releasable connections like data, fluid transfer, or other suitable connections. In some examples of the present latching system, the connector bodies are adapted to swap the connections enabled inside, allowing different electrical connectors to be inserted for example.

Within each connector body 102, 104 as a part of the latching portion 114 there are magnets positioned just under the mating faces 106, 108. In the example shown, the latching portion 114 can move relative to the connecting portion 112. In this example, the rotation of the latching portion 114 in this example allows the magnets on one connecting body 104 to be repositioned relative to the other connecting body 102 As one of ordinary skill in the art would appreciate that the magnets can be any type of magnet, such as permanently magnetized ferromagnetic materials or rare earth magnets. In other examples of the present latching system 100, an electromagnet could be used to selectively engage or reverse the magnetic poles.

Figure 2:
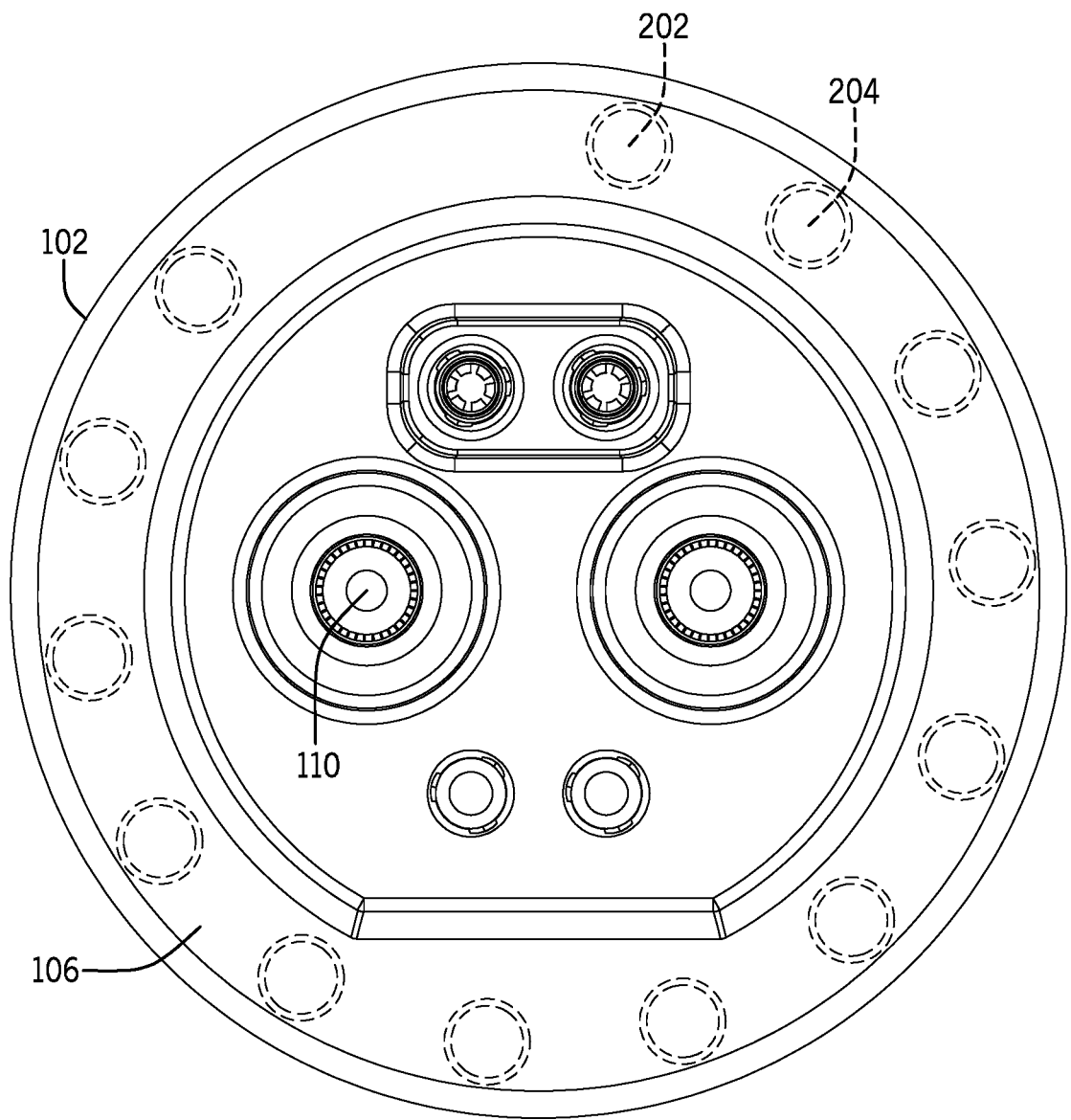
FIG. 2 shows a perspective view of the mating face of the first connector body of the example latching system of FIG. 1A.
Figure 3:
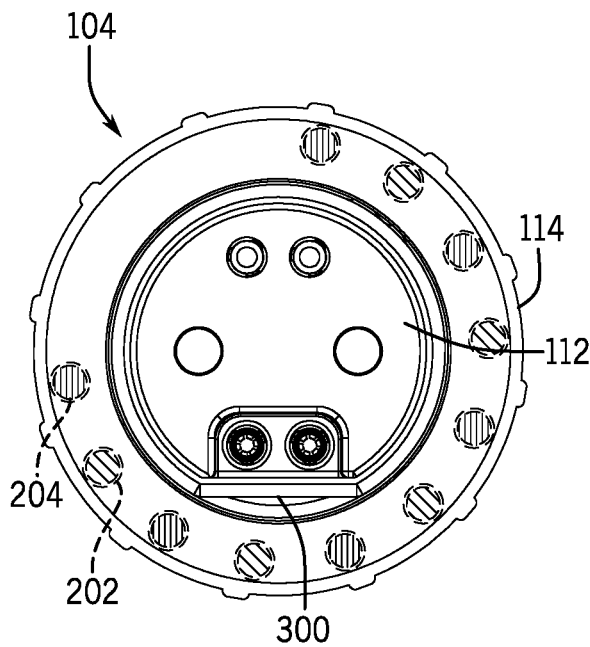
FIG. 3 shows a perspective view of the mating face of the second connector body of the example latching system of FIG. 1A in a first position.
Figure 7:
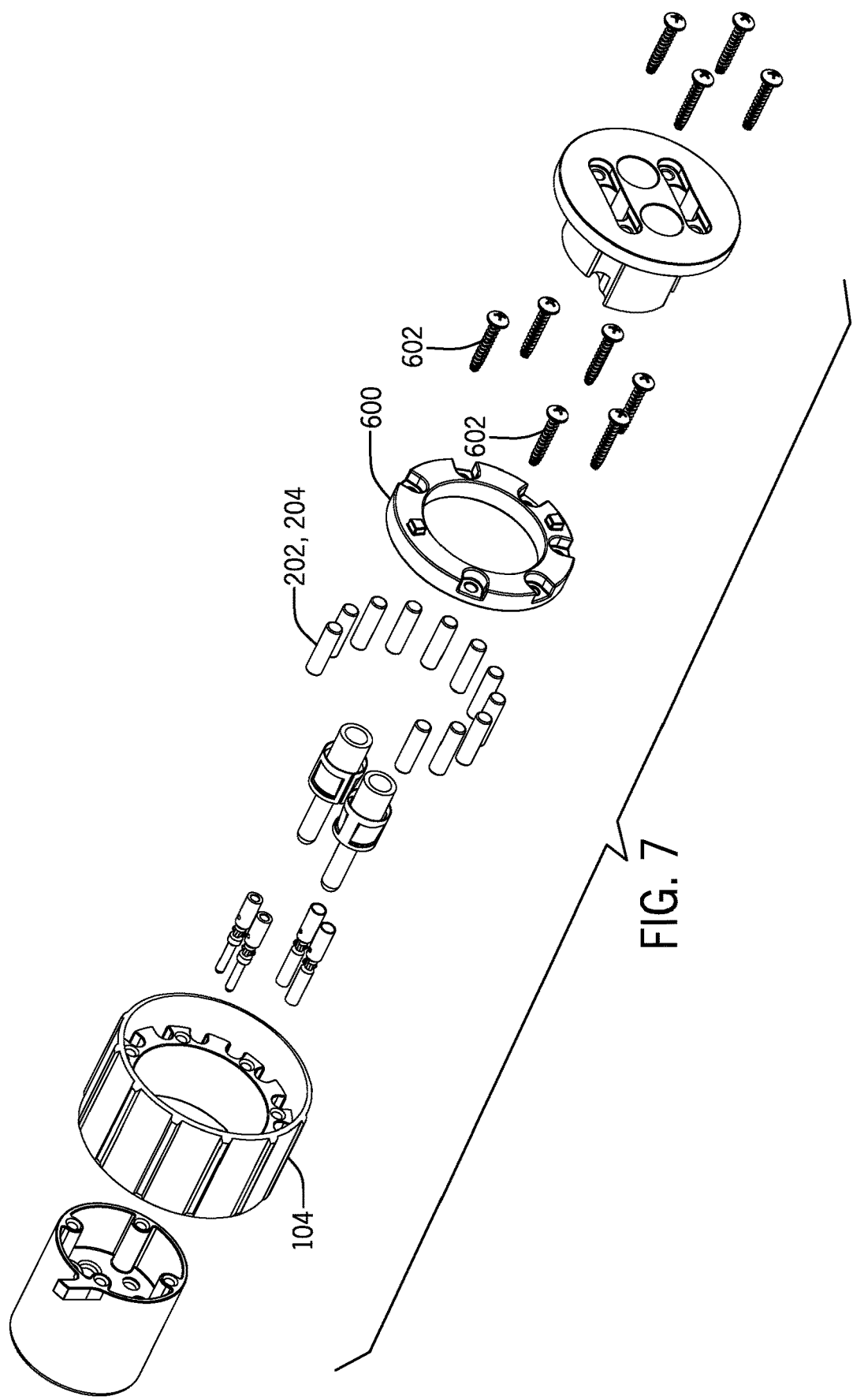
FIG. 7 shows an exploded view of the second connector body of the example latching system of FIG. 1A.

As shown in FIGS. 2-3, there are two alternating series of magnets 202 and 204 in different orientations. Each magnet, regardless of its shape and attendant magnetic field, has a north and south pole. The magnet orientation is based on how the poles are positioned within the magnet and their relative organization when the magnet is installed in the connector body 102, 104. For the purposes of this discussion, a magnet is termed to be facing up if the north pole of that magnet is closest to the respective mating surface 106 or 108 and a magnet is termed to be facing down if the south pole of the magnet is closest to the mating surface 106 or 108. In the figures, the illustrated green circle represents North Magnetic Pole and the purple circle represents South Magnetic Pole for visualization only. Magnets are exposed in FIGS. 2 and 3 for illustrated purpose only, but are enclosed in some examples by a cover 600 with screws 602 as shown in FIGS. 6-7. Magnets may be exposed, partially exposed, or fully enclosed and retained by any other means as desired.

As in the example convertible force latching system shown in the figures, each of the series of magnets are placed in an alternating pattern. This pattern is repeated in a similar manner on the opposite connector body 104 as in the connector body 102. In the example shown, the magnets are placed in a circular pattern on the connector body 102 with the north poles of the first series of magnets closest to the mating surface 106, facing "up", and the south poles of the second series of magnets closest to the mating surface 106, facing "down".

The arrangement enables different uses depending on the relative arrangements of the magnets on one connecting body to the other depending on the position of the moving latching portion 114. In a first arrangement, illustrated in FIG. 3, the magnets in the respective alternating series on each connector body 102, 104 with opposite poles are facing each other to assist in holding the latching system 100 together. Thus, the first and second series of magnets are aligned with the third and fourth series of magnets, respectively, in a first position such that the first and second series of magnets are attracted to the third and fourth series of magnets.

Figure 4:
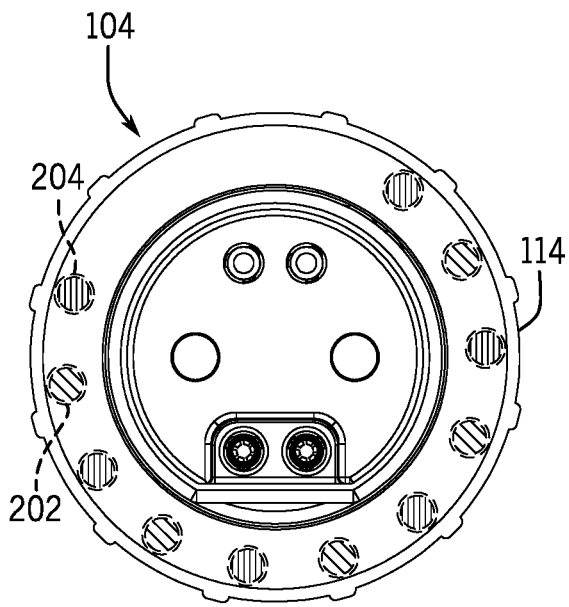
FIG. 4 shows another perspective view of the mating face of the second connector body of the example latching system of FIG. 1A in a second position.
Figure 5A:
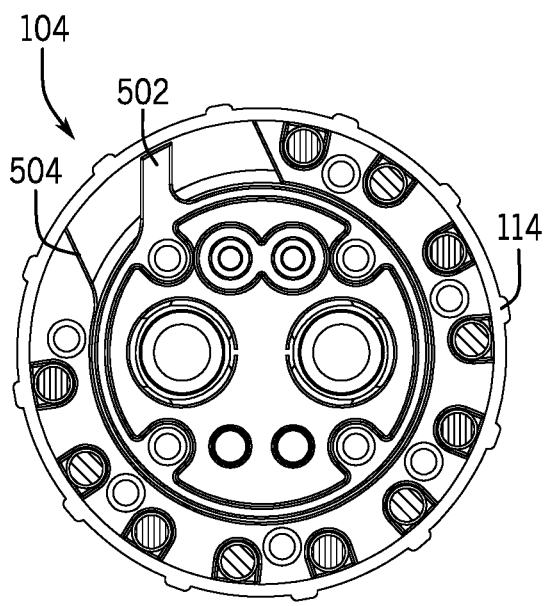
FIG. 5A shows a first perspective views of the mating face of the second connector body of the example latching system of FIG. 1A exhibiting the motion guide features in a first position.
Figure 5B:
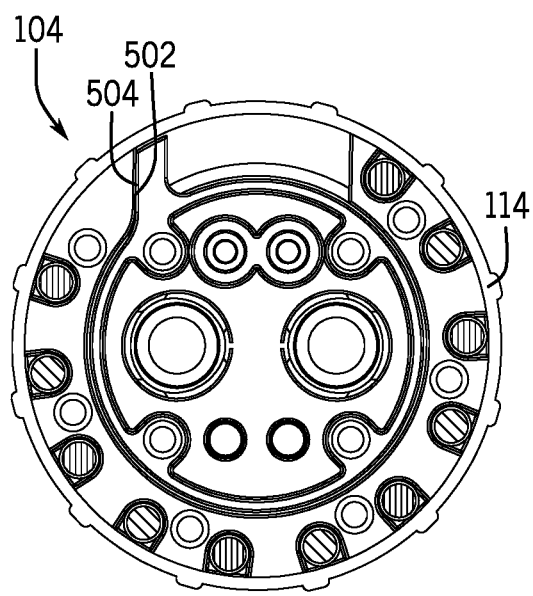
FIG. 5B shows a second perspective views of the mating face of the second connector body of the example latching system of FIG. 1A exhibiting the motion guide features in a second position.

Contrastingly, the latching portion 114 can be moved in along a predetermined motion path to alter the alignments of the magnets. In the example shown in FIG. 3, the latching portion can be rotated to shift the magnets in each series 202 and 204 from facing opposite magnetic poles to facing identical charged magnetic poles to the position shown in FIG. 4. The repulsion of the similar poles assists in decoupling the latching system 100. Thus, the second arrangement illustrated in FIG. 4 has the first and second series of magnets aligned with the fourth and third series of magnets, respectively, in a second position such that the first and second series of magnets are repelled by the third and fourth series of magnets. In some examples of the present invention, a locking mechanism can be added to prevent rotation when not desired by the user.

By allowing for both magnetic attraction and repulsion, the connection allows for assistive coupling and decoupling. During mating, the attraction of unlike magnetic poles from both connector bodies 102, 104 automatically pulls the parts together which makes them easy to mate. Even if the magnets on connector bodies 102, 104 do not line up perfectly, as the latches get close to each other, the repulsion of magnets pushes like magnetic poles away from each other and the attraction of magnets pulls unlike magnetic poles together. This push/pull effect forces Latch 2 to rotate automatically and align all magnets in Latch 2 to Latch 1 for mating. The combination of attraction for all magnet pairs also acts as retention to keep the parts mated.

When the magnets are aligned with opposite poles, the attraction helps correctly seat the connector bodies within each other. When the magnets are aligned with the same poles, the repulsion helps push the connectors apart. Rather than requiring the user to apply sufficient force, the magnets thereby increasing the user ability to couple these connectors by reducing the force needed to couple the connectors.

Figure 8:
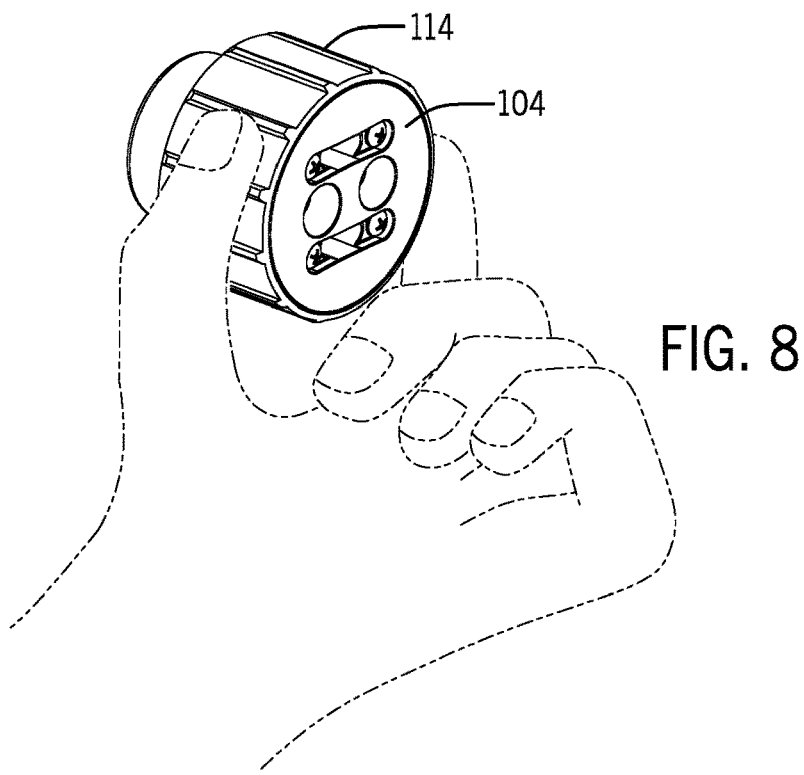
FIG. 8 is a perspective view exhibiting the user manually activating the example latching system of FIG. 1A.
Figure 9:
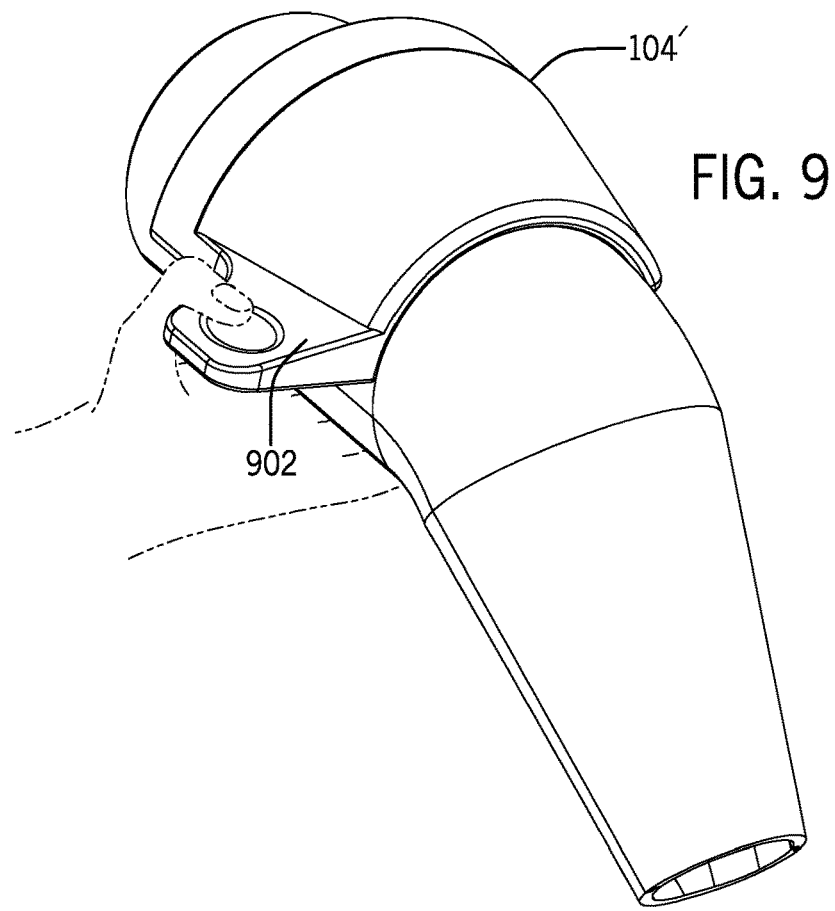
FIG. 9 is a perspective view exhibiting the user utilizing a force actuation interface mechanism.

The latch portion 114 is external to the connector body which is accessible by hand for rotation to unlatch, for any size of a scalable latching system 100. This eliminates the need for an additional mechanism such as a trigger or engagement releasing unit connected internally for unlatching, which allows the convertible force latching system to have a more compact size and lower manufacturing cost due to less components involved. Such an example latching system 100 is shown used in FIG. 8. In some embodiments, the connector body 104, further includes a force actuation interface mechanism such as a handle or tab to more easily utilize the latching portion 114. Such an example latching system 100 is shown in FIG. 1B and used in FIG. 9 a second connector body 104' with handle 902.

Motion of the latching portion 114 of the connector body 104 shown in FIG. 3 is restrained in the example shown by a series of motion guides including a motion stop 502. The stop 502 is a projection from second connector body 104 that fits into a matching recess 504 in the second connector body 104. The shape and size of the stop 502 and recess 504 are determined to allow the shifting of the magnets between each of the alignments discussed above. For example, when the latching system 100 is rotated to the position shown in FIG. 4, the stop 502 and recess 504 together with the shaping of the connector bodies 102 and 104 themselves form a predetermined motion path which directs and guides user interaction along the proper shift between the attracting position and repelling position. After rotation, all magnets in corresponding connector body 102 have same exact poles as the corresponding mating magnets in corresponding connector body 104.

As illustrated in FIG. 1A-5, both connector bodies 102, 104 have rotational alignment features 300 as shown. As illustrated in FIG. 1A, because magnets are put in a circular pattern, parts with the latch can be mated in multiple orientations as long as the magnets align. Rotational alignment features, such as the features shown in FIG. 1A are included in some examples added to the connector bodies 102, 104 to prevent them from mating in the wrong orientation. In the example shown, the alignment feature changes the mating surface from a perfect round shape to a "D" shape. The flat on the "D" shape interferes with the round when the two connectors are mated in the wrong orientation. They can only be mated while the flats align with each other. The alignment features can be in any other forms, shapes or means as desired. These rotational alignment features, such as the features shown in FIG. 1A are included in some examples added to the connector bodies 102, 104 to prevent them from mating in the wrong orientation.

The arrangement of the series of magnets 202, 204 can include many combinations of size, shape and total number of magnets used and can vary based on application. The size and total number of screws or any other suitable fasteners used can also vary based on requirement. For example, another example latching system 100 according to the teachings of the presentation could include as little as two magnets oriented in opposite orientations. In other examples of the latching system 100, the alternating series of magnets can be arranged in other shapes with repeating patterns of upward and downward facing magnets. In some examples, the magnets are arranged in two rows and the connector bodies 102, 104 can be shaped to enable translationary motion to alter the alignment of the magnets relative to one another. One of ordinary skill will also comprehend that any repeating pattern and combination of restraints would be suitable if used according to the teachings of this disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:
1. A latching system comprising:
 a first connector body comprising:
  at least one first magnet having a first pole oriented closer to a first mating surface of the first connector body than a second pole of the first magnet, and
  at least one second magnet having a third pole of the second magnet oriented closer to the first mating surface than a fourth pole of the second magnet;
 a second connector body comprising at least one third magnet having a fifth pole of the third magnet oriented closer to a second mating surface of the second connector body than a sixth pole of the third magnet; and
 wherein:
  the first connector body or the second connector body comprises a latch portion configured to directly receive a rotational user interaction, wherein the first connector body or the second connector body is configured to move between a first position and a second position in response to the rotational user interaction,
  the at least one first magnet and the at least one third magnet are configured to align and attract one another while the first connector body or the second connector body is in the first position, and
  the at least one second magnet and the at least one third magnet are configured to align and repel one another while the first connector body or the second connector body is in the second position.

2. The latching system of claim 1, wherein latch portion comprises an exposed exterior surface on the first connector body or the second connector body.

3. The latching system of claim 1, wherein the latch portion extends at least partially around a circumferential exterior of the first connector body or the second connector body.

4. The latching system of claim 1, wherein the latch portion further comprises a force actuation interface mechanism.

5. The latching system of claim 4, wherein the force actuation interface mechanism comprises a tab or a handle.

6. The latching system of claim 1, wherein at least one of the first connector body or the second connector body further comprises a motion guide to restrict motion of the latch portion relative to the first connector body or the second connector body along a predetermined motion path.

7. The latching system of claim 1, wherein the first mating surface and the second mating surface are in contact while the first connector body or the second connector body is in the first position.

8. The latching system of claim 1, wherein the first mating surface and the second mating surface are separated while the first connector body or the second connector body is in the first position.

9. The latching system of claim 1, wherein:
the second connector body comprises at least one fourth magnet having a seventh pole of the fourth magnet oriented closer to the second mating surface than an eighth pole of the third magnet,
the at least one second magnet and the at least one fourth magnet are configured to align and attract one another while the first connector body or the second connector body is in the first position, and
the at least one first magnet and the at least one fourth magnet are configured to align and repel one another while the first connector body or the second connector body is in the second position.

10. The latching system of claim 1, wherein:
the at least one first magnet is a first plurality of magnets,
the at least one second magnet is a second plurality of magnets,
the first plurality of magnets and the second plurality of magnets are arranged in a circular, alternating pattern in the first connector body,
the at least one third magnet is a third plurality of magnets, and
the third plurality of magnets is arranged in a circular pattern in the second connector body.

11. The latching system of claim 1, wherein:
the first connector body further comprises at least one first electrical contact,
the second connector body further comprises at least one second electrical contact, and
the at least one first electrical contact and the at least one second electrical contact are configured to connect to one another while the first connector body or the second connector body is in the first position.

12. A latching system comprising:
a first connector body comprising:
at least one first magnet having a first pole oriented closer to a first mating surface of the first connector body than a second pole of the first magnet, and
at least one second magnet having a third pole of the second magnet oriented closer to the first mating surface than a fourth pole of the second magnet;

a second connector body comprising at least one third magnet having a fifth pole of the third magnet oriented closer to a second mating surface of the second connector body than a sixth pole of the third magnet; and
wherein:
the first connector body or the second connector body comprises a latch portion configured to move the first connector body or the second connector body between a first position and a second position,
the latch portion extends at least partially around a circumferential exterior of the first connector body or the second connector body,
the at least one first magnet and the at least one third magnet are configured to align and attract one another while the first connector body or the second connector body is in the first position, and
the at least one second magnet and the at least one third magnet are configured to align and repel one another while the first connector body or the second connector body is in the second position.

13. The latching system of claim 12, wherein the latch portion moves the first connector body or the second connector body between the first position and the second position responsive to a rotational user interaction with the latch portion.

14. The latching system of claim 12, wherein the latch portion extends around approximately half of the circumferential exterior of the first connector body or the second connector body.

15. The latching system of claim 12, wherein the latch portion extends around substantially all of the circumferential exterior of the first connector body or the second connector body.

16. The latching system of claim 12, wherein the latch portion further comprises a force actuation interface mechanism.

17. The latching system of claim 12, wherein the latch portion further comprises a locking mechanism configured to prevent motion of the first connector body or the second connector body between the first position and the second position.

18. A latching apparatus comprising:
a first connector body comprising a latch portion comprising at least one first magnet having a first pole oriented closer to a mating surface of the first connector body than a second pole of the magnet;
wherein:
the latch portion rotates around the first connector body and is configured to directly receive a rotational user interaction, wherein the first connector body is configured to move between a first position and a second position in response to rotational movement of the latch portion along a predetermined motion path,
the at least one first magnet is configured to align with and attract at least one second magnet of a second connector body while the connector body is in the first position, and
the at least one first magnet is configured to misalign with the at least one second magnet while the first connector body is in the second position.

19. The latching apparatus of claim 18, wherein the at least one first magnet is configured to align with and repel at least one third magnet of the second connector body while the first connector body is in the second position.

20. The latching apparatus of claim 18, further comprising an electrical connection portion, wherein electrical connection portion remains static relative to the latch portion and the first connector body that move together responsive to the rotational user interaction.

\* \* \* \* \*